(12) United States Patent
Thielman

(10) Patent No.: US 9,701,060 B2
(45) Date of Patent: Jul. 11, 2017

(54) EXTRUSION-TO-SHEET PRODUCTION LINE AND METHOD

(71) Applicant: Rambus Delaware LLC, Sunnyvale, CA (US)

(72) Inventor: W. Scott Thielman, North Royalton, OH (US)

(73) Assignee: Rambus Delaware LLC, Brecksville, OH (US)

( * ) Notice: Subject to any disclaimer, the term of this patent is extended or adjusted under 35 U.S.C. 154(b) by 0 days.

(21) Appl. No.: 15/047,673

(22) Filed: Feb. 19, 2016

(65) Prior Publication Data

US 2016/0311150 A1 Oct. 27, 2016

Related U.S. Application Data

(63) Continuation of application No. 13/772,613, filed on Feb. 21, 2013, now Pat. No. 9,296,146.

(60) Provisional application No. 61/608,686, filed on Mar. 9, 2012.

(51) Int. Cl.

| B29C 43/48 | (2006.01) |
|---|---|
| B29C 59/04 | (2006.01) |
| B29C 47/00 | (2006.01) |
| B29C 47/88 | (2006.01) |
| B29C 43/24 | (2006.01) |
| B29D 11/00 | (2006.01) |

(52) U.S. Cl.
CPC ............ *B29C 59/043* (2013.01); *B29C 43/24* (2013.01); *B29C 47/004* (2013.01); *B29C 47/0021* (2013.01); *B29C 47/8805* (2013.01); *B29C 47/885* (2013.01); *B29C 47/886* (2013.01); *B29C 47/8845* (2013.01); *B29D 11/00* (2013.01); *B29C 47/0061* (2013.01); *B29C 59/04* (2013.01); *B29C 2043/486* (2013.01)

(58) Field of Classification Search
CPC .............. B29C 47/004; B29C 47/0061; B29C 2043/486; B29C 59/04
See application file for complete search history.

(56) References Cited

U.S. PATENT DOCUMENTS

| 3,756,760 | A | * | 9/1973 | McBride | ................. | B29C 43/24 425/224 |
|---|---|---|---|---|---|---|
| 4,486,363 | A | | 12/1984 | Pricone et al. | | |
| 4,487,481 | A | | 12/1984 | Suzawa | | |
| 4,618,216 | A | | 10/1986 | Suzawa | | |

(Continued)

*Primary Examiner* — James Mackey
(74) *Attorney, Agent, or Firm* — Renner, Otto, Boisselle & Sklar, LLP

(57) ABSTRACT

Extrusion-to-sheet production line and method comprise first and second rolls set to a predetermined gap through which a continuously-extruded sheet of molten plastic material passes to calender the sheet to a predetermined thickness. The sheet passes through a nip formed between the second roll and a continuous belt looped around a third roll and a fourth roll. The belt comprises an embossing pattern of optical element shapes that is an inverse pattern of optical element shapes to be embossed at a first major surface of the sheet. The sheet remains in contact with the second roll until the sheet passes through the nip, where the pattern of optical element shapes on the belt is embossed into the first major surfaces of the sheet. Downstream of the third roll is a cooling area through which the belt passes.

20 Claims, 4 Drawing Sheets

(56) References Cited

U.S. PATENT DOCUMENTS

| | | |
|---|---|---|
| 4,642,736 A | 2/1987 | Masuzawa et al. |
| 4,681,723 A | 7/1987 | Jester |
| 5,040,098 A | 8/1991 | Tanaka et al. |
| 5,046,826 A | 9/1991 | Iwamoto et al. |
| 5,057,974 A | 10/1991 | Mizobe |
| 5,359,691 A | 10/1994 | Tai et al. |
| 5,414,599 A | 5/1995 | Kaneko et al. |
| 5,528,720 A | 6/1996 | Winston et al. |
| 5,945,131 A | 8/1999 | Harvey et al. |
| 6,074,192 A * | 6/2000 | Mikkelsen ............ B29C 43/222 264/1.6 |
| 6,167,182 A | 12/2000 | Shinohara et al. |
| 6,200,399 B1 | 3/2001 | Thielman |
| 6,260,887 B1 | 7/2001 | Fujii et al. |
| 6,373,636 B1 | 4/2002 | Conley |
| 6,908,295 B2 | 6/2005 | Thielman et al. |
| 7,559,989 B1 | 7/2009 | Conley |
| 7,781,022 B2 | 8/2010 | Conley |
| 2005/0153011 A1 | 7/2005 | Funaki et al. |
| 2007/0126145 A1 | 6/2007 | Coyle |
| 2008/0223510 A1 | 9/2008 | Mizuno et al. |
| 2009/0267246 A1 | 10/2009 | Conley et al. |
| 2010/0109185 A1 | 5/2010 | Ogawa et al. |

\* cited by examiner

EXTRUSION-TO-SHEET PRODUCTION LINE AND METHOD

CROSS-REFERENCE TO RELATED APPLICATIONS

This application is a continuation of U.S. patent application Ser. No. 13/772,613, filed Feb. 21, 2013, issued as U.S. Pat. No. 9,296,146, which claims the benefit of U.S. Provisional Application Ser. No. 61/608,686, filed Mar. 9, 2012, the entire disclosure of which is incorporated herein by reference.

BACKGROUND

It is known to continuously emboss patterns of microprismatic elements on one or more surfaces of sheets or films using one or more embossing bands or belts. However, there is a need to be able to produce thicker polymer sheets of a single material containing a pattern of optical elements at a relatively high rate while maintaining high tolerances on the geometry of the optical elements.

DETAILED DESCRIPTION

Figure 1:
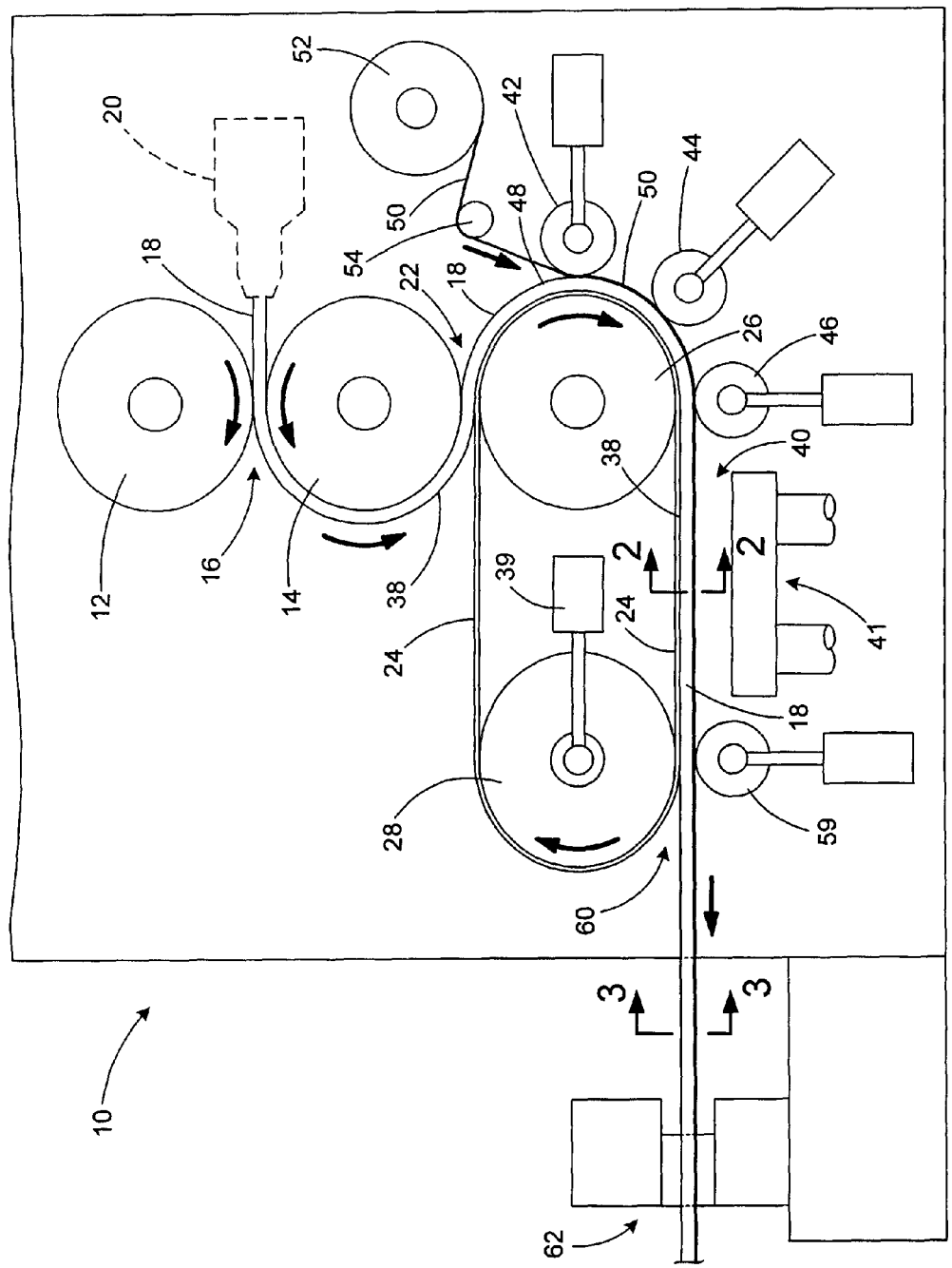
FIG. 1 is a schematic side view of an exemplary extrusion-to-sheet production line embodiment.

The embodiments will now be described with reference to the drawings, wherein like reference numerals are used to refer to like elements throughout. The figures are not to scale. Features that are described and/or illustrated with respect to an exemplary embodiment may be used in the same way or in a similar way in one or more other embodiments and/or in combinations with or instead of the features of other embodiments.

As described in detail below, the extrusion-to-sheet production line and method comprise a first roll and a second roll set to a predetermined gap through which a continuously-extruded sheet of molten plastic material passes to calender the sheet to a predetermined thickness. The sheet is caused to pass through a nip formed between the second roll and a continuous belt looped around a third roll and a fourth roll spaced apart from one another. The nip is where the belt is at its closest point between the second roll and the third roll. The belt comprises an embossing pattern of optical element shapes that is an inverse pattern of a pattern of optical element shapes to be embossed at a first major surface of the sheet. The sheet remains in contact with the second roll until the sheet passes through the nip, where the pattern of optical element shapes on the belt is embossed into the first major surface of the sheet. Downstream of the third roll is a flat cooling area through which the belt passes while the first major surface of the sheet is still in contact with the embossing pattern on the belt for cooling the sheet and completing the set of the pattern of optical element shapes into the sheet while the sheet is in a flat configuration. Downstream of the flat cooling area is a separation area where the belt separates from the sheet after completing the set of the pattern of optical element shapes into the sheet.

The extrusion-to-sheet production line has the advantage that relatively thick polymer sheets of a specified thickness containing a precise pattern of optical element shapes can be continuously produced at a relatively high rate. Typical production rates range from about 1.5 millimeters per second for sheets near the maximum of the thickness range described below to about 500 millimeters per second for sheets near the minimum of the thickness range.

FIG. 1 shows an example of an extrusion-to-sheet production line or apparatus 10 comprising a first roll 12 and a second roll 14 set to a predetermined gap 16 through which a continuously-extruded sheet 18 of molten plastic material passes to calender the sheet to a predetermined thickness. The gap 16 is settable to calender the sheet 18 to a defined thickness. In an example, the calendered sheet 18 has a thickness of between about 0.3 millimeters and about 15 millimeters.

In the example shown in FIG. 1, the sheet 18 of molten plastic material is continuously extruded through a gap die 20 into the gap 16 between the first and second rolls 12 and 14. The plastic material is comprised of a single optical material (for example, acrylic, polycarbonate or other appropriate material) which may be rigid or flexible depending on thickness.

Figure 1A:
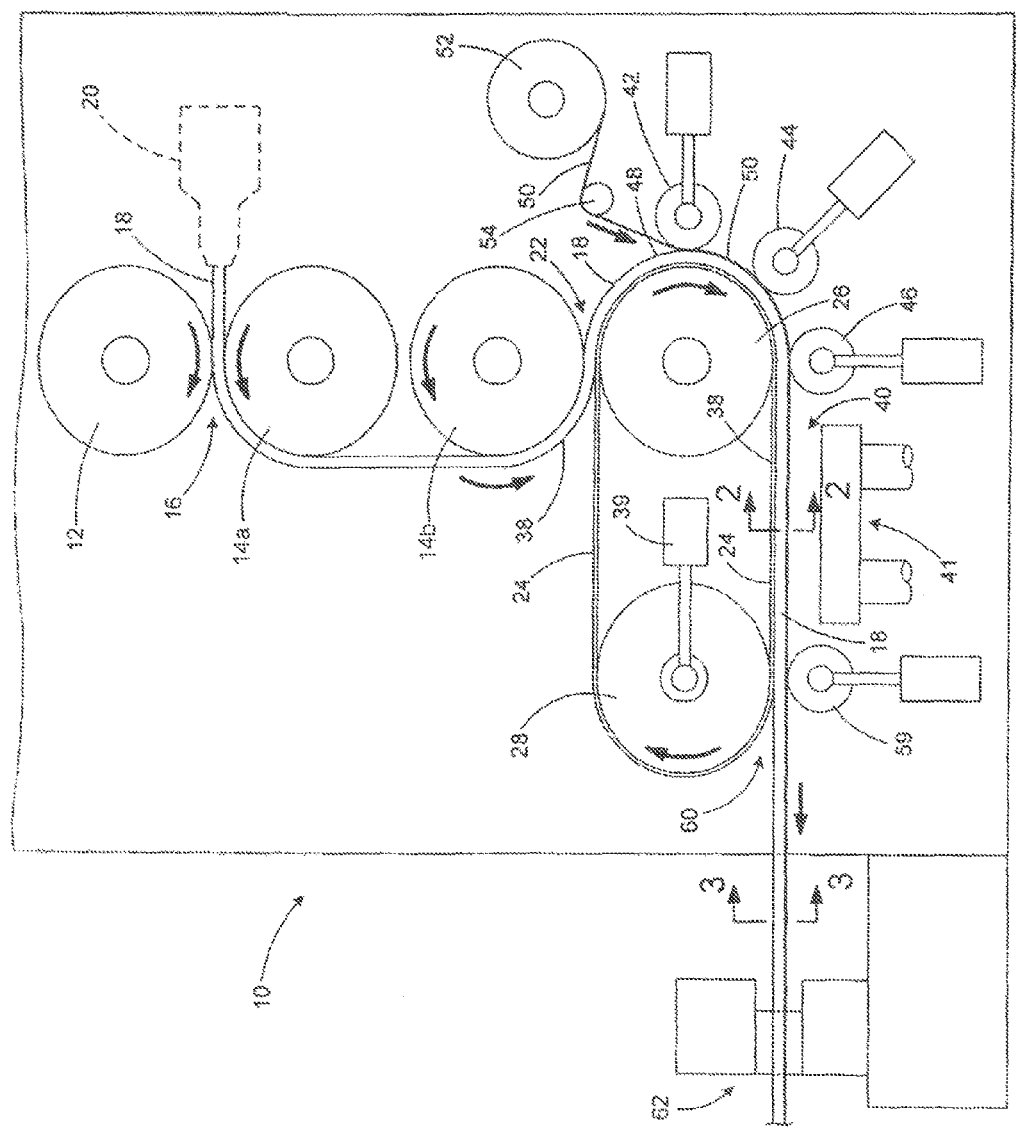
FIG. 1A is a schematic side view of an exemplary extrusion-to-sheet production line embodiment.

After passing through the gap 16, the sheet 18 remains in contact with the second roll 14 and rotation of the second roll 14 causes the sheet 18 to pass through a nip 22 formed between the second roll 14 and a continuous belt 24 looped around a heated third roll 26 and a cooled fourth roll 28 in spaced relation from the third roll 26. The nip 22 is where the belt 24 is at the closest point between the second roll 14 and the third roll 26. The first, second and third rolls 12, 14 and 26 are located in order adjacent one another, and the third and fourth rolls 26 and 28 are offset from one another and configured to receive the continuous embossing belt 24. In the example shown in FIG. 1, the first, second and third rolls are stacked vertically one above the other. However, other arrangements of the rolls are possible and may be used. Moreover, as exemplified in FIG. 1A, the second roll may include a first sub-roll 14a and a second sub-roll 14b adjacent one another. In this case, the gap is between the first roll and the first sub-roll of the second roll, and the nip is between the second sub-roll of the second roll and the third roll.

The belt 24 comprises an embossing pattern 30 of optical element shapes 32 that is an inverse of a pattern 34 of optical element shapes 36 to be embossed at a first major surface 38 of the sheet 18 (see FIG. 2). The rolls described herein as being heated may be electrically heated, heated by circulating hot oil, or heated in another suitable way. The rolls described herein as being cooled may be cooled by circulating coolant, such as water.

Rolls 12, 14, 26 and 28 are rotatably driven in the direction of the arrows shown in FIG. 1 using any suitable drive (including but not limited to a chain drive or synchronous hydraulic or electric motors, not shown) to advance the belt 24 and cause the continuously-extruded sheet 18 to pass through the gap 16 between the first and second rolls 12 and 14 and remain in contact with the second roll 14 until the sheet passes through the nip 22. As the sheet 18 passes through the nip 22, the nip transfers the pattern of optical element shapes 32 from the belt 24 to the extruded sheet 18 while the sheet is near or above the glass transition temperature of the plastic material.

In an example, the first roll 12 is cooled and the second roll 14 is heated to a temperature to maintain the extruded sheet 18 near, at or above its glass transition temperature upstream of the nip. In another example, both the first roll 12 and the second roll 14 are cooled to cool the extruded sheet 18 to a temperature at which the plastic material has sufficient structural integrity to form the sheet but is still malleable enough to emboss.

In the example shown in FIG. 1, a belt adjuster 39 is connected to the fourth roll 28 to steer the belt 24 around the third and fourth rolls 26 and 28, and to adjust the spacing between the third and fourth rolls 26 and 28 to accommodate belts of different lengths and to allow the belt 24 to be installed and removed.

Downstream of the third roll 26 is a flat cooling area 40 through which the belt 24 passes while the first major surface 38 of the sheet 18 is still in contact with the embossing pattern on the belt. In the example shown in FIG. 1, at least one pressure roller 59 is provided in the region of the flat cooling area 40 for pressing the sheet against the belt to assist in maintaining the sheet in contact with the embossing pattern on the belt during passage through the flat cooling area.

The flat cooling area 40 is located between the third and fourth rolls 26 and 28 such that the third roll rotates towards the flat cooling area, which is for cooling the sheet and completing the set of the pattern of optical element shapes 36 into the sheet while the sheet is in a flat configuration in order to maintain high geometrical tolerances on the individual optical element shapes of the pattern. In the example shown in FIG. 1, the flat cooling area 40 includes a cooling element 41 through which a coolant is circulated to cool the sheet. The cooling element 41 is located close to the second major surface 48 of the sheet 18.

In another example also shown in FIG. 1, at least one pressure roller is provided downstream of the nip 22 and upstream of the flat cooling area 40 for pressing the sheet 18 against the embossing pattern on the belt 24 while the sheet is still in a hot state to set the pattern of optical element shapes 36 into the sheet. FIG. 1 shows three circumferentially-spaced pressure rollers 42, 44 and 46 that are movable into and out of engagement with a second major surface 48 of the sheet for sequentially pressing the sheet against the belt downstream of the nip and upstream of the flat cooling area while the sheet is still in a hot state to set the pattern of optical element shapes into the sheet. A greater or lesser number of pressure rollers may be provided as desired. The pressure rollers 42, 44 and 46 as well as the pressure roller 59 are each typically faced with rubber or another compliant material.

In another example also shown in FIG. 1, a carrier film 50 is superimposed into direct contact with the second major surface 48 of the sheet 18 downstream of the nip 22 and upstream of the flat cooling area 40. FIG. 1 shows the carrier film 50 being fed from a supply reel 52 around a guide roller 54 for superimposing the carrier film 50 into direct contact with the second major surface 48 of the sheet 18 upstream of the first pressure roller 42. In another example, the supply reel and guide roller are located to superimpose the carrier film into direct contact with the second major surface of the sheet upstream of the second roll 14.

Figures 2A, 2B:
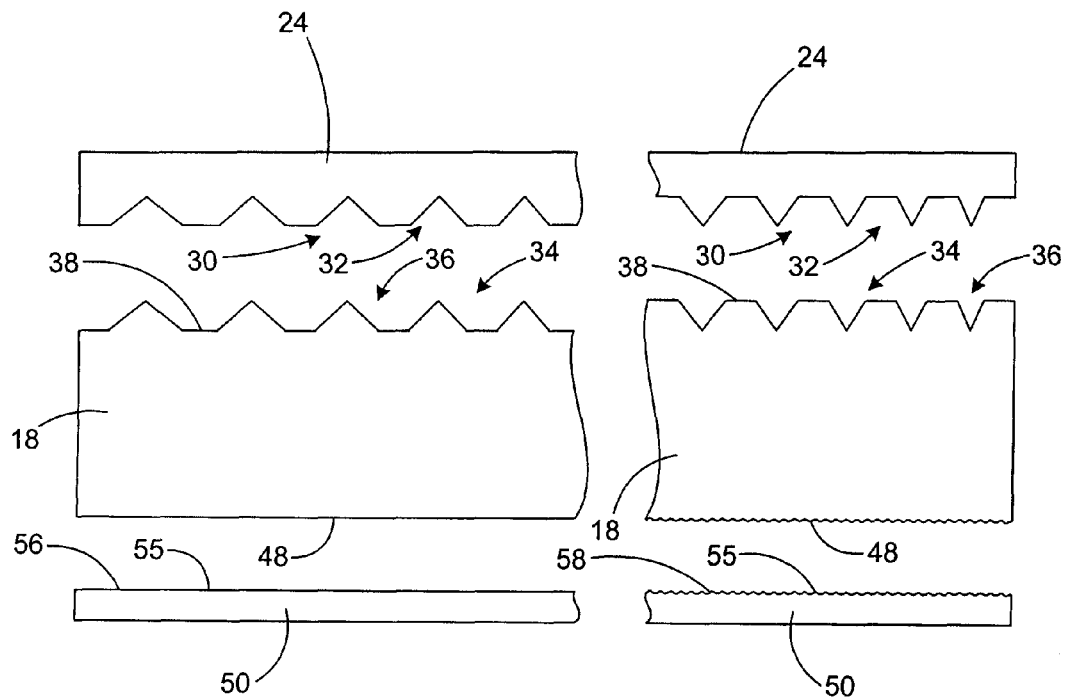
FIGS. 2A and 2B are enlarged exploded fragmentary cross-sections through the embossing belt, plastic sheet, and carrier film in the flat cooling area of the extruder-to-sheet production line of FIG. 1, taken on the plane of the line 2-2 of FIG. 1.

The carrier film 50 is made of a suitable protective material such as biaxially oriented polyethylene terephthalate that has a glass transition temperature higher than the temperature of the sheet at the nip so the carrier film will not melt or fuse to the sheet. The carrier film 50 has a surface 55 with a finish that is transferred onto the second major surface 48 of the sheet by pressure asserted by one or more of the pressure rollers. FIGS. 2A and 2B schematically show examples of surface finishes on the carrier film 50, a smooth finish 56 shown in FIG. 2A, and a matte finish 58 shown in FIG. 2B. In another example, the surface 55 of the carrier film 50 that is superimposed into direct contact with the second major surface 48 of the sheet 18 comprises an additional embossing pattern of optical element shapes that is an inverse pattern of an additional pattern of optical element shapes to be embossed at the second major surface 48 of the sheet.

Exemplary optical element shapes 36 that are set into the first major surface 38 of the sheet 18 (and if desired also into the second major surface 48 of the sheet) include light-scattering elements, which are typically features of indistinct shape or surface texture, such as printed features, ink-jet printed features, selectively-deposited features, chemically etched features, laser etched features, and so forth. Such optical element shapes are typically formed in a master (not shown) by the above-mentioned processes and are transferred from the master to the belt 24 by a suitable process such as electro-forming. Other exemplary optical element shapes include features of well-defined shape such lenticular or prismatic grooves and features of well-defined shape that are small relative to the linear dimensions of the major surfaces of the sheet, which are sometimes referred to as micro-optical element shapes. The smaller of the length and width of micro-optical element shapes is less than one-tenth of the width of the sheet and the larger of the length and width of the micro-optical element shapes is less than one-half of the width of the sheet. The length and width of the micro-optical elements are measured in a plane parallel to the major surfaces of the sheet. Micro-optical elements are shaped to predictably reflect or refract light. However, one or more of the surfaces of the micro-optical elements may be modified, such as roughened, to produce a secondary effect on the light reflected or refracted by the micro-optical elements.

At least one of the size, shape, depth, density and orientation of the optical element shapes 36 set into the sheet 18 may vary across the width and/or the length of the sheet. In the examples shown in FIGS. 2A and 2B, the size and density of the optical element shapes 36 set into the first major surface 38 of the sheet vary across the width of the sheet. The optical element shapes 36 set into the sheet 18 can be protrusions from the sheet as shown in FIG. 2A, or indentations into the sheet as shown in FIG. 2B. The maximum size of a light guide that can be made using the production line 10 is nominally equal to the width and length of the belt 24. The production line 10 can be used to make light guides smaller than the maximum-size light guide by locating multiple discrete patterns of optical element shapes along the length and/or width of the belt. The patterns of optical element shapes need not be the same. For example, the patterns of optical element shapes for the light guides of several tablet devices can be located on the belt alongside a pattern of optical element shapes for the light guide of a large-screen television.

Figures 3A, 3B:
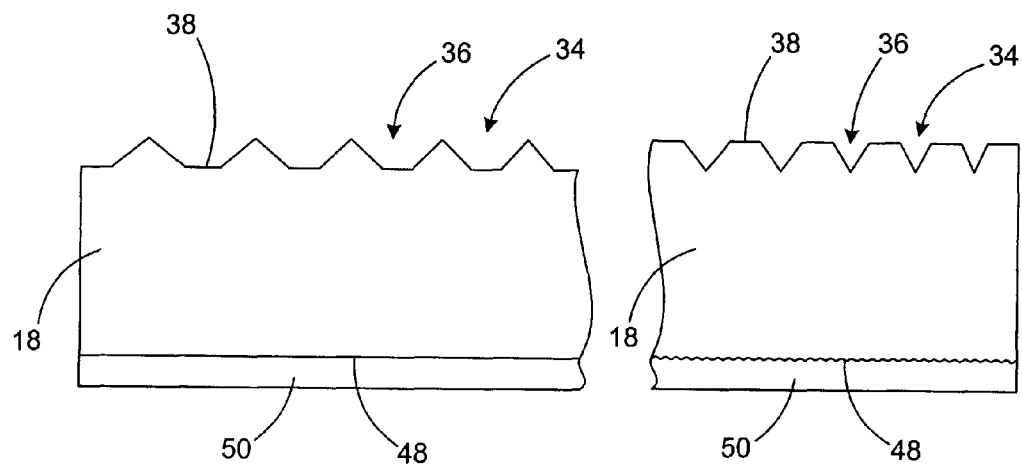
FIGS. 3A and 3B are enlarged fragmentary cross-sections through the plastic sheet and carrier film of FIG. 1 downstream of the flat cooling area, taken on the plane of the line 3-3 of FIG. 1.

Downstream of the flat cooling area 40 is a separation area 60 where the belt 24 separates from the sheet 18 and the superimposed carrier film 50 after completing the set of the pattern of optical element shapes into the sheet. FIGS. 1, 3A and 3B show the sheet 18 and the carrier film 50 passing through a sheet output area 62 aligned tangentially with the third and fourth rolls 26 and 28 after the belt 24 has separated from the sheet 18 in the separation area 60. The carrier film 50 is a disposable protective layer that can be subsequently removed from the sheet 18 whenever desired.

Figure 4:
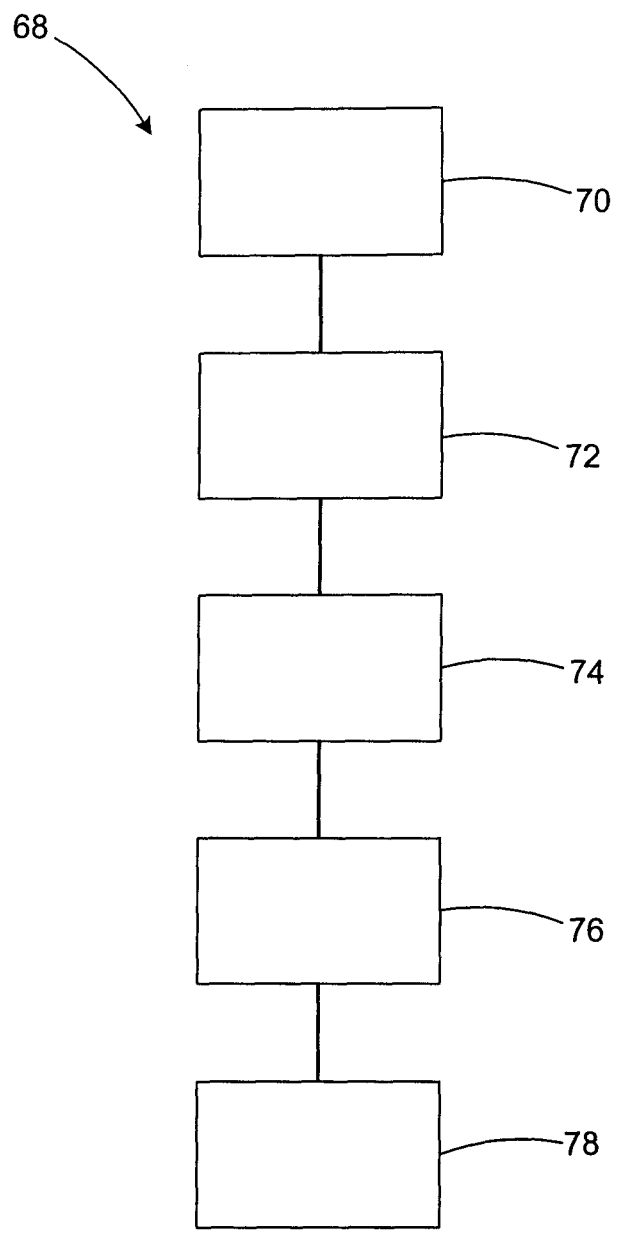
FIG. 4 is a flow chart of an example of a method to produce embossed plastic sheet from a continuously-extruded sheet of molten plastic using a continuous embossing belt.

FIG. 4 is a flow chart 68 of an example of a method to produce embossed plastic sheet from a continuously extruded-sheet of molten plastic using a continuous embossing belt.

In block 70 the continuously-extruded sheet 18 of molten plastic material passes between the first and second rolls 12 and 14 set to a predetermined gap to calender the sheet to a predetermined thickness (see FIG. 1).

In block 72 the sheet passes through the nip 22 formed between the second roll 14 and the continuous embossing belt 24 looped around the heated third roll 26 and cooled fourth roll 28 spaced apart from one another. The nip is where the belt is at the closest point between the second and third rolls. The belt comprises an embossing pattern of optical element shapes to be embossed at the first major surface of the sheet.

In block 74 the sheet is kept in contact with the second roll 14 until the sheet passes through the nip, where the pattern of optical element shapes on the belt is embossed into the first major surface of the sheet.

In block 76 the belt passes through the flat cooling area 40 downstream of the third roll 26 while the first major surface of the sheet is still in contact with the embossing pattern of optical element shapes on the belt to cool the sheet and complete the set of the pattern of optical element shapes into the sheet while the sheet is in a flat configuration.

In block 78 the belt separates from the sheet after completing the set of the pattern of optical element shapes into the sheet.

The orientation of the extrusion-to-sheet production line is merely exemplary and different orientations can be used. For example, the line can be inverted so that the embossed sheet exits the line at an area above the area through which the continuously-extruded sheet of molten plastic material enters the line or the line can be rotated through a suitable angle.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

Although this disclosure has described certain embodiments, equivalent alterations and modifications will become apparent upon the reading and understanding of the specification. In particular, with regard to the various functions performed by the above-described components, the terms used to describe such components are intended to correspond, unless otherwise indicated, to any component which performs the specified function of the described component (e.g., that is functionally equivalent), even though not structurally equivalent to the exemplary embodiments. In addition, while a particular feature may have been disclosed with respect to only one embodiment, such feature may be combined with one or more other features as may be desired and advantageous for any given or particular application.

What is claimed is:

1. An extrusion-to-sheet production line, comprising:
a first roll and a second roll assembly, the second roll assembly comprising a first sub-roll and a second sub-roll, the first roll and the first sub-roll of the second roll assembly set to a gap through which an extruded sheet of molten plastic material passes to calender the sheet to a thickness;
a heated third roll and a fourth roll spaced apart from one another;
a belt looped around the third roll and the fourth roll, the belt comprising an embossing pattern of optical element shapes that is an inverse pattern of a pattern of optical element shapes to be embossed at a first major surface of the sheet;
wherein the second sub-roll of the second roll assembly and the belt at a closest point between the second sub-roll of the second roll assembly and the third roll form a nip that transfers the pattern of optical element shapes on the belt to the first major surface of the sheet;
a cooling area downstream of the third roll and upstream of the fourth roll through which the belt passes while the first major surface of the sheet is still in contact with the embossing pattern on the belt for cooling the sheet and setting the pattern of optical element shapes into the sheet while the sheet is in a flat configuration, the cooling area comprising a cooling element configured to cool the sheet; and
a separation area downstream of the cooling area where the belt separates from the sheet after setting the pattern of optical element shapes into the sheet.

2. The extrusion-to-sheet production line of claim 1, wherein at least one of the first sub-roll and the second sub-roll of the second roll assembly is heated to a temperature that maintains the sheet at or above the glass transition temperature of the plastic material upstream of the nip.

3. The extrusion-to-sheet production line of claim 1, additionally comprising a gap die through which the sheet of molten plastic material is extruded into the gap between the first roll and the first sub-roll of the second roll assembly.

4. The extrusion-to-sheet production line of claim 1, additionally comprising one or more pressure rollers for superimposing a carrier film into direct contact with a second major surface of the sheet.

5. The extrusion-to-sheet production line of claim 4, wherein a surface of the carrier film that is superimposed into direct contact with the second major surface of the sheet has a surface finish, the shape of which is transferred onto the second major surface of the sheet by pressure asserted by the one or more pressure rollers.

6. The extrusion-to-sheet production line of claim 4, wherein the surface of the carrier film that is superimposed into direct contact with the second major surface of the sheet has a smooth finish.

7. The extrusion-to-sheet production line of claim 1, wherein the optical element shapes of the pattern that is set into the sheet are micro-optical element shapes.

8. The extrusion-to-sheet production line of claim 1, wherein the cooling element is arranged such that the cooling element is spaced apart from the belt and from a second major surface of the sheet opposite the first major surface of the sheet while the first major surface of the sheet is still in contact with the embossing pattern.

9. The extrusion-to-sheet production line of claim 1, wherein a pressure roller is provided downstream of the nip and upstream of the cooling area for pressing the sheet against the embossing pattern on the belt while the sheet is still in a hot state.

10. The extrusion-to-sheet production line of claim 1, wherein the first sub-roll of the second roll assembly is adjacent the second sub-roll of the second roll assembly.

11. The extrusion-to-sheet production line of claim 1, wherein:
the first roll, the first sub-roll of the second roll assembly, the second sub-roll of the second roll assembly, and the third roll are located in order adjacent one another; and
the fourth roll is offset from the third roll.

12. A method, comprising:
passing an extruded sheet of molten plastic material between a first roll and a first sub-roll of a second roll assembly set to a gap to calender the sheet to a thickness;
passing the sheet through a nip formed between a second sub-roll of the second roll assembly and a belt looped around a heated third roll and a fourth roll spaced apart from one another, the nip being where the belt is at a closest point between the second sub-roll of the second roll assembly and the third roll, the belt comprising an embossing pattern of optical element shapes that is an inverse of a pattern of optical element shapes to be embossed at a first major surface of the sheet, where the pattern of optical element shapes on the belt is embossed into the first major surface of the sheet;
passing the belt through a cooling area downstream of the third roll and upstream of the fourth roll while the first major surface of the sheet is still in contact with the embossing pattern on the belt to cool the sheet and set the pattern of optical element shapes into the sheet while the sheet is in a flat configuration, the cooling area comprising a cooling element configured to cool the sheet; and
separating the belt from the sheet after setting the pattern of optical element shapes into the sheet.

13. The method of claim 12, additionally comprising maintaining at least one of the first sub-roll and the second sub-roll of the second roll assembly at a temperature such that the sheet remains above the glass transition temperature of the plastic material upstream of the nip.

14. The method of claim 12, additionally comprising extruding molten plastic material through a gap die to form the sheet.

15. The method of claim 12, additionally comprising superimposing a carrier film into direct contact with a second major surface of the sheet downstream of the nip and upstream of the cooling area.

16. The method of claim 15, additionally comprising transferring a finish shape on a surface of the carrier film that is superimposed into direct contact with the second major surface of the sheet onto the second major surface of the sheet during pressing of the carrier film against the sheet.

17. The method of claim 15, wherein the finish on the surface of the carrier film that is superimposed into direct contact with the second major surface of the sheet is a smooth finish.

18. The method of claim 12, wherein the cooling element is arranged such that the cooling element is spaced apart from the belt and from a second major surface of the sheet opposite the first major surface of the sheet while the first major surface of the sheet is still in contact with the embossing pattern.

19. The method of claim 12, further comprising pressing the sheet against the embossing pattern on the belt downstream of the nip and upstream of the cooling area while the sheet is still in a hot state.

20. The method of claim 12, wherein:
the first roll, the first sub-roll of the second roll assembly, the second sub-roll of the second roll assembly, and the third roll are located in order adjacent one another; and
the fourth roll is offset from the third roll.

* * * * *